(12) United States Patent
Albero et al.

US011348121B2

(10) Patent No.: US 11,348,121 B2
(45) Date of Patent: May 31, 2022

(54) MULTI-SOURCE ANOMALY DETECTION AND AUTOMATED DYNAMIC RESOLUTION SYSTEM

(71) Applicant: Bank of America Corporation, Charlotte, NC (US)

(72) Inventors: George Albero, Charlotte, NC (US); Elijah Clark, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 351 days.

(21) Appl. No.: 16/600,682

(22) Filed: Oct. 14, 2019

(65) Prior Publication Data

US 2021/0110407 A1 Apr. 15, 2021

(51) Int. Cl.
*G06Q 30/00* (2012.01)
*G06N 20/00* (2019.01)

(52) U.S. Cl.
CPC ......... *G06Q 30/0185* (2013.01); *G06N 20/00* (2019.01)

(58) Field of Classification Search
CPC .............................. G06Q 20/20; H04L 67/306
See application file for complete search history.

(56) References Cited

U.S. PATENT DOCUMENTS

| 7,792,770 | B1 | 9/2010 | Phoha et al. |
| 8,407,160 | B2 | 3/2013 | Cretu et al. |
| 8,640,015 | B2 | 1/2014 | Ide et al. |
| 9,195,669 | B2 | 11/2015 | Martini et al. |
| 9,794,291 | B2 | 10/2017 | Martini et al. |
| 9,843,596 | B1 | 12/2017 | Averbuch et al. |
| 9,990,587 | B2 | 6/2018 | Okanohara et al. |
| 10,003,607 | B1 | 6/2018 | Kolman et al. |
| 10,057,296 | B2 | 8/2018 | Martini et al. |
| 10,146,954 | B1 | 12/2018 | Brisebois et al. |
| 10,177,998 | B2 | 1/2019 | Parandehgheibi et al. |
| 10,187,409 | B1 | 1/2019 | Averbuch et al. |
| 10,333,953 | B1 | 6/2019 | Averbuch et al. |
| 2007/0245420 | A1 | 10/2007 | Yong et al. |
| 2019/0378348 | A1* | 12/2019 | Fox ........................ G06N 5/003 |
| 2020/0358778 | A1* | 11/2020 | Gopinathapai ..... G06F 16/2246 |
| 2021/0294950 | A1* | 9/2021 | Honda ................... G06N 20/00 |

FOREIGN PATENT DOCUMENTS

CN 102044116 A * 5/2011 ............. G07G 3/003

* cited by examiner

*Primary Examiner* — Alvin L Brown
(74) *Attorney, Agent, or Firm* — Banner & Witcoff, Ltd.

(57) ABSTRACT

Arrangements for detecting anomalies and dynamically generating a response are presented. In some examples, attribute data including a plurality of source elements may be received. The source element data may be received from a plurality of source computing systems. The attribute data, including the source element data, may be analyzed using machine learning techniques to identify any anomalies in the attribute data. If an anomaly is detected, a notification may be generated including data associated with the anomaly, a user associated with the anomaly and the like. The notification may be transmitted to a computing device for display. In some examples, if an anomaly is detected, data associated with the anomaly may be compared to pre-stored rules to determine whether a pre-stored rule applies to the identified anomaly. If a pre-stored rule applies, an instruction or command may be generated and transmitted to one or more source computing devices or systems.

18 Claims, 12 Drawing Sheets

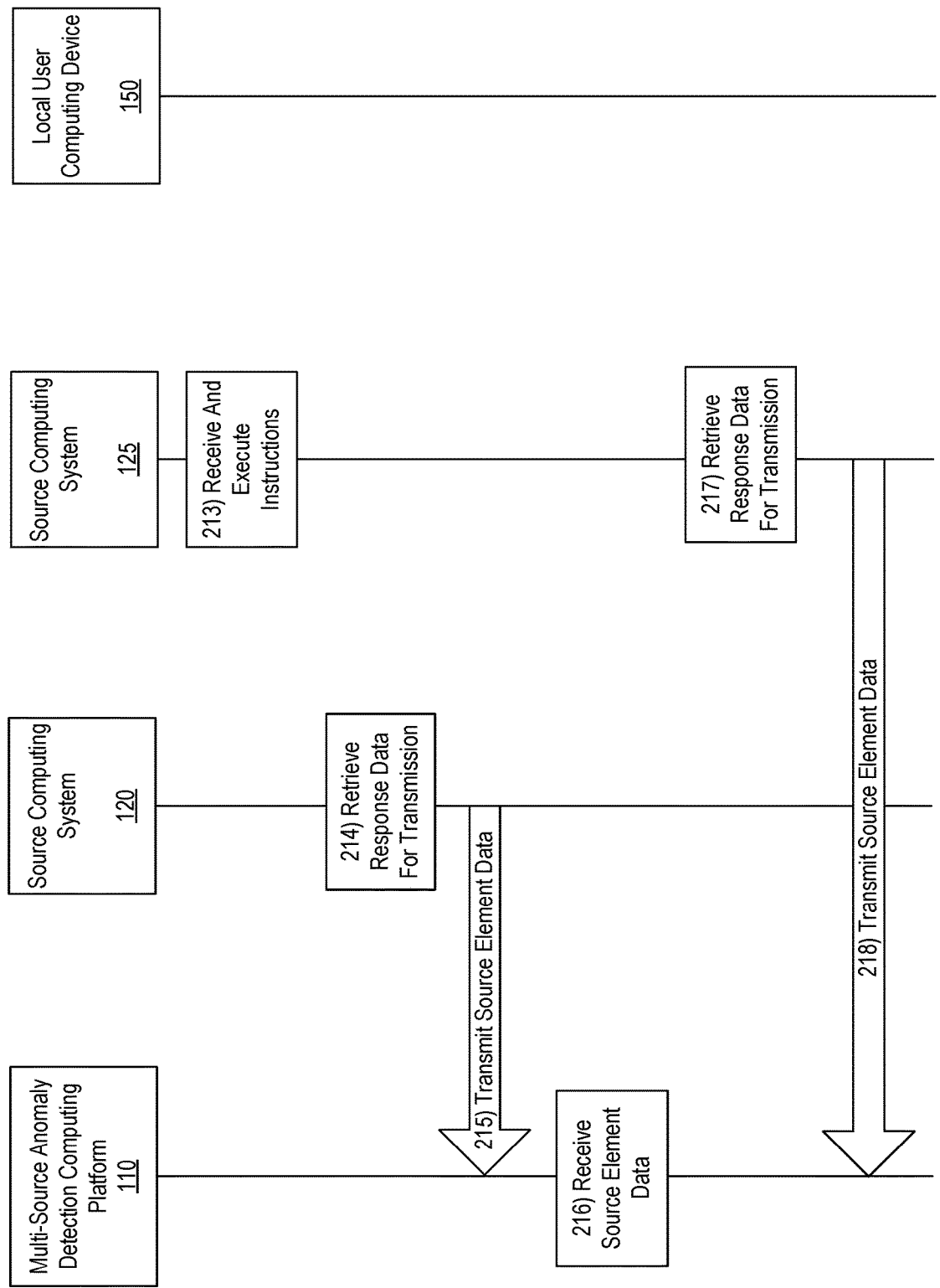

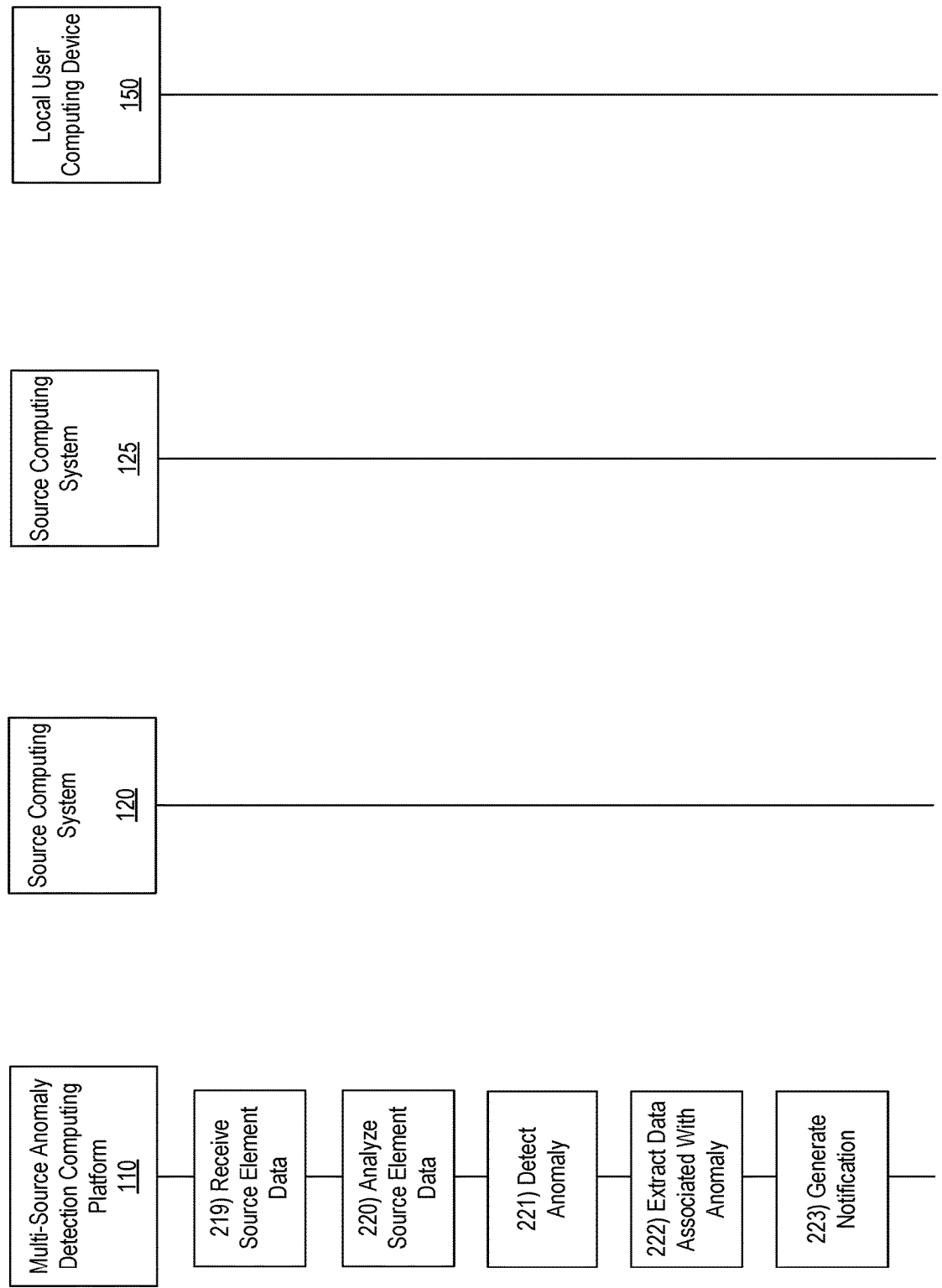

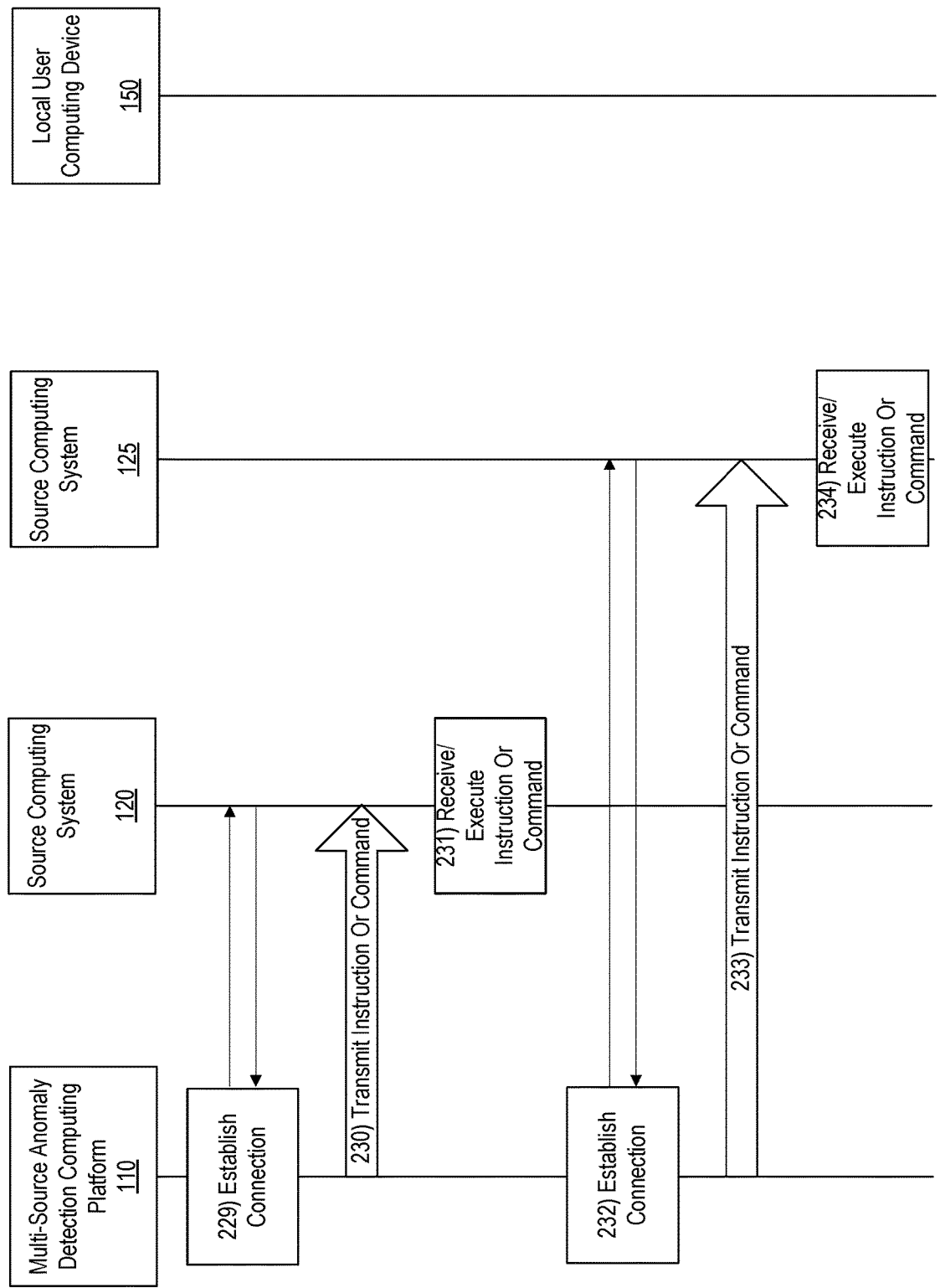

MULTI-SOURCE ANOMALY DETECTION AND AUTOMATED DYNAMIC RESOLUTION SYSTEM

BACKGROUND

Aspects of the disclosure relate to electrical computers, systems, and devices for multi-source anomaly detection and resolution. In particular, one or more aspects of the disclosure relate to using machine learning to detect anomalies in multi-source data and dynamically generate resolution instructions.

Large enterprise organizations can have tens of thousands or even hundreds of thousands of employees. In many large enterprise organizations, employees may have similar roles but work in different business units, may have different roles but be within a same salary level or band, or the like. Accordingly, understanding whether various attributes of the employees, such as compensation, benefits, and the like, are being handled similarly or in an appropriate manner can be difficult when evaluating such a large number of employees. Further, given the number of employees in such large enterprise organizations, unauthorized activity may often go unnoticed for extended periods or forever. Accordingly, it would be advantageous to use machine learning to understand and evaluate attributes associated with employees to detect anomalies and automatically execute dynamic resolutions to control one or more computing systems in order to mitigate impact of a detected anomaly.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with evaluating attributes of vast numbers of employees within an enterprise to identify anomalies and quickly and efficiently implement a dynamic response to mitigate impact of the anomaly.

In some examples, attribute data may be received. The attribute data may include data associated with a plurality of source elements. In some examples, the source element data may be received from a plurality of source computing systems or devices. The attribute data, including the source element data may be analyzed using machine learning techniques to identify any anomalies in the attribute data. If an anomaly is detected, a notification may be generated including data associated with the anomaly, a user associated with the anomaly and the like. The notification may be transmitted to a computing device for display.

In some examples, if an anomaly is detected, data associated with the anomaly, user, or the like, may be compared to pre-stored rules to determine whether a pre-stored rule applies to the identified anomaly, user, or the like. If a pre-stored rule applies, an instruction or command may be generated and transmitted to one or more source computing devices or systems. In some examples, the instruction or command may limit access to one or more systems or applications, prevent distribution from one or more systems or applications by an identified user, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing multi-source anomaly detection in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, large enterprise organizations may have tens or even hundreds of thousands of employees to manage, monitor, and the like. When evaluating issues or attributes such as compensation, benefits, and the like, it can be difficult to accurately compare employees in similar roles but different business units, different roles but at the same salary level, or the like. Further, it can be difficult to monitor attributes to detect unauthorized activity, such as a deliberate overpayment of an expense reimbursement, a repeated higher than deserved bonus, or the like. Accordingly, aspects described herein are directed to using machine learning techniques to evaluate attributes associated with a plurality of employees to identify variances or anomalies in the attributes.

As discussed herein, attribute data and associated source element data may be received. In some examples, the attribute data including source element data may be received from a plurality of source element computing systems. The data may be analyzed using machine learning to detect anomalies or variances in the data. If an anomaly is detected, in some examples, a notification may be generated including data related to the anomaly, a user associated with the anomaly, and the like. The notification may be transmitted to a computing device for display.

In some arrangements, the data associated with the anomaly, user, or the like, may be compared to one or more pre-stored rules related to various types of anomalies and actions to mitigate impact of an anomaly. If the data matches or otherwise corresponds to a pre-stored rule (e.g., falls within parameters or criteria of the pre-stored rule), an instruction or command may be generated and transmitted to one or more of the source element computing systems. In some examples, the instruction or command, when executed, may cause the source element computing system to restrict access to the system or one or more applications (e.g., for a particular user or users), prevent disbursement of funds to a particular user or by a particular user, and the like.

These and various other arrangements will be discussed more fully below.

Figure 1A:
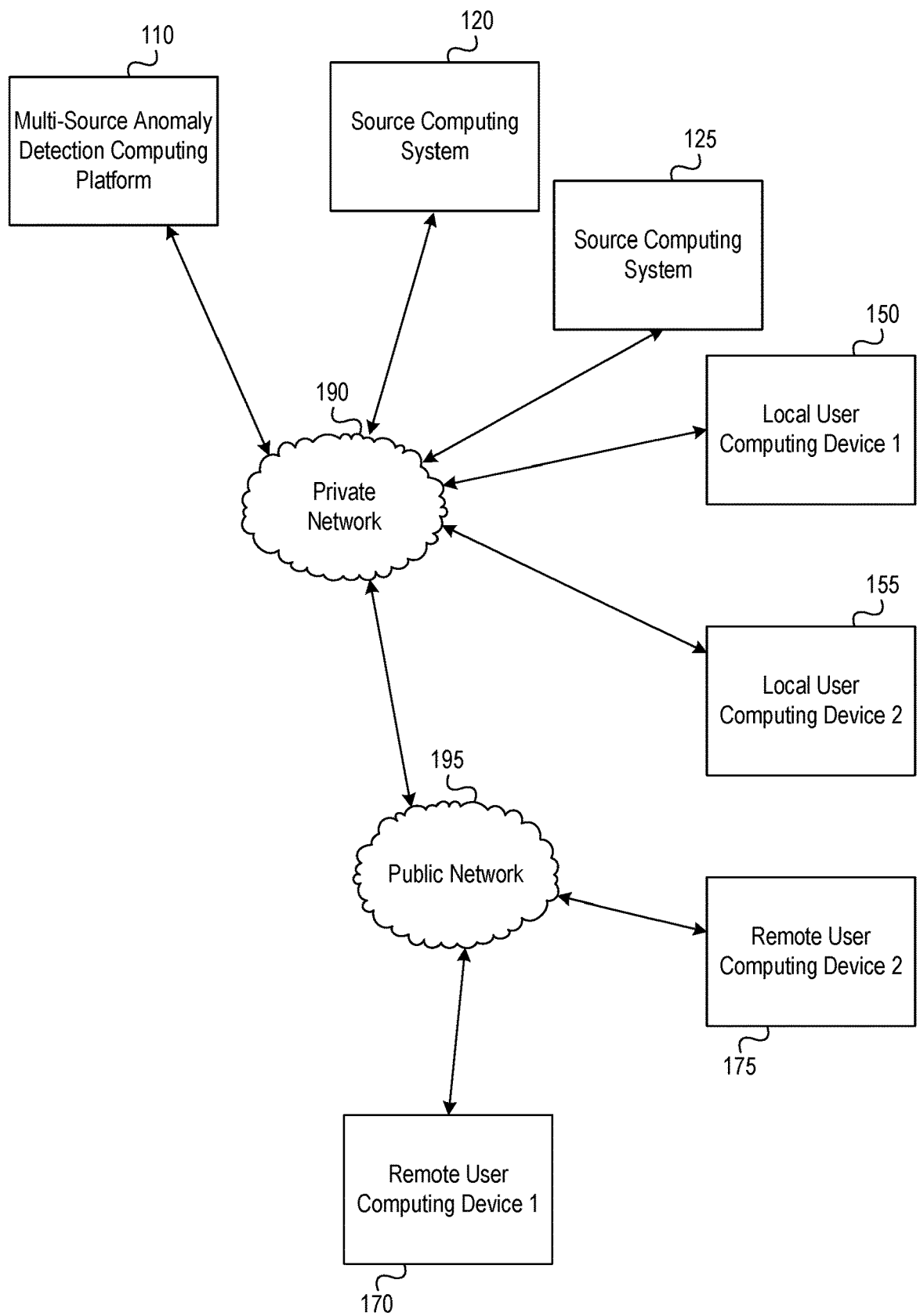
FIGS. 1A and 1B depict an illustrative computing environment for implementing multi-source anomaly detection in accordance with one or more aspects described herein.
Figure 1B:
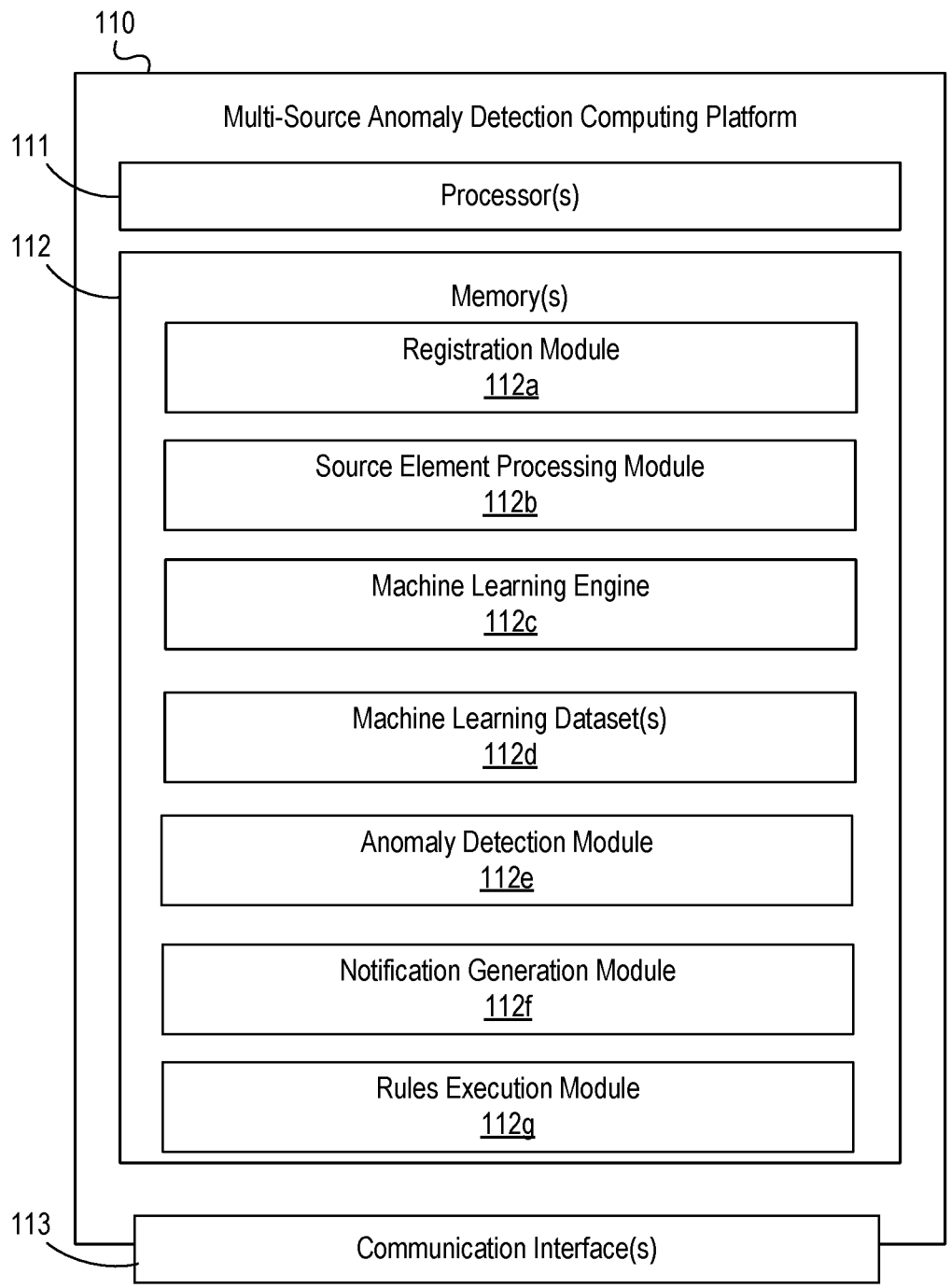

FIGS. 1A-1B depict an illustrative computing environment for implementing and using a system for multi-source anomaly detection and processing in accordance with one or more aspects described herein. Referring to FIG. 1A, computing environment 100 may include one or more computing devices and/or other computing systems. For example, computing environment 100 may include multi-source anomaly detection computing platform 110, a source computing system 120, a source computing system 125, a first local user computing device 150, a second local user computing device 155, a first remote user computing device 170, and a second remote user computing device 175. Although two source computing systems 120, 125 are shown in FIG. 1A, more or fewer computing systems may be used without departing from the invention. Further, although the multi-source anomaly detection computing platform 110, source computing system 120, and source computing system 125 are described as separate devices in some aspects, the multi-source anomaly detection computing platform 110 may be integrated into (e.g., within a same physical device, in communication with or connected to, or the like) source computing system 120 and/or source computing system 125, without departing from the invention.

Multi-source anomaly detection computing platform 110 may be configured to provide intelligent, dynamic, detection of anomalies in data received from a plurality of sources using, for example, machine learning. For instance, historical data may be received and used as machine learning training data in order to evaluate subsequent data from the plurality of sources to detect one or more anomalies. For instance, data may be received from a plurality of sources, such as source computing system 120, source computing system 125, and the like. Each source computing system 120, 125 may be a separate system or may be integrated within another source computing system. In some examples, each source computing system 120, 125 may capture, process, store, and the like, a different source element (e.g., different data format, data type, or the like) associated with an attribute being evaluated. For instance, the multi-source anomaly detection computing platform 110 may be used to identify anomalies in an attribute such as compensation at, for instance, large enterprise organizations. Compensation may include a plurality of source elements, such as salary, hourly pay, bonuses, deferred compensation, expense reimbursement, and the like. In some arrangements, each source element or type of compensation input may be received from a different source computing system. In other examples, one or more types of data may be received from a same source computing system.

In some examples, receiving the source elements may include receiving data associated with each source element. For instance, salary data for a plurality of employees may be received. Each salary data element may be associated with an employee and may include a name, employee number or other unique identifier of the employee, as well as a compensation band or level, role of the employee, business unit of the employee, and the like. Accordingly, source elements for each attribute may be evaluated, e.g., using machine learning, to compare source elements across a same role within an organization, at a same or similar salary band or level, within a group or business unit, or the like. Accordingly, anomalies in data may be detected more quickly, efficiently, and accurately because vast amounts of data are being compared across different working groups, business units, roles, and the like, to provide a clear picture of the attribute throughout the organization. Anomalies may include overpayment, underpayment, unauthorized payment, and the like.

Source computing system 120, source computing system 125, and the like, may be a computing device or plurality of devices suitable for hosting and/or executing one or more applications configured to receive source element data, process source element data, generate source element outputs, and the like. For instance, source computing system 120, source computing system 125, and the like, may include one or more computing devices hosting and/or executing applications configured to store user information (e.g., information related to employees of an enterprise), receive and process payroll for an enterprise, receive and process expense account reimbursements, receive and process bonuses or deferred compensation, or the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the multi-source anomaly detection computing platform 110, source computing system 120, source computing system 125, or the like to control parameters associated with the devices or systems, update or execute rules, modify settings and the like. In some examples, local user computing device 150, local user computing device 155, and the like may receive and display notifications of detected anomalies and/or may execute predetermined rules in response to detection of an anomaly.

The remote user computing device 170 and remote user computing device 175 may be used to communicate with, for example, one or more systems, computing platforms, devices, or the like, to receive and display one or more notifications related to an anomaly, receive and display an output of one or more executed rules executed in response to detection of an anomaly, or the like. Remote user computing devices 170, 175 may include user computing devices, such as mobile devices including smartphones, tablets, laptop computers, and the like, and/or desktop or other computing devices.

Computing environment 100 also may include one or more computing platforms. For example, and as noted above, computing environment 100 may include multi-source anomaly detection computing platform 110. As illustrated in greater detail below, multi-source anomaly detection computing platform 110 may include one or more computing devices configured to perform one or more of the functions described herein. For example, multi-source anomaly detection computing platform 110 may include one or more computers (e.g., laptop computers, desktop computers, servers, server blades, or the like).

As mentioned above, computing environment 100 also may include one or more networks, which may interconnect one or more of multi-source anomaly detection computing platform 110, source computing system 120, source computing system 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, multi-source anomaly detection computing platform 110, source computing system 120, source computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect multi-source anomaly detection computing platform 110, source computing system 120, source computing system 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., multi-source anomaly detection computing platform 110, source computing system 120, source computing system 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., multi-source anomaly detection computing platform 110, source computing system 120, source computing system 125, local user computing device 150, local user computing device 155).

Referring to FIG. 1B, multi-source anomaly detection computing platform 110 may include one or more processors 111, memory 112, and communication interface 113. A data bus may interconnect processor(s) 111, memory 112, and communication interface 113. Communication interface 113 may be a network interface configured to support communication between multi-source anomaly detection computing platform 110 and one or more networks (e.g., private network 190, public network 195, or the like). Memory 112 may include one or more program modules having instructions that when executed by processor(s) 111 cause multi-source anomaly detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of multi-source anomaly detection computing platform 110 and/or by different computing devices that may form and/or otherwise make up multi-source anomaly detection computing platform 110.

For example, memory 112 may have, store and/or include a registration module 112a. Registration module may store instructions and/or data that may cause or enable the multi-source anomaly detection computing platform 110 to receive data related to one or more source elements systems, such as source computing system 120, source computing system 125, and the like. The data may include system identifiers, types of data stored or processed by a particular system, and the like. Further, receipt of the registration data may cause generation of one or more instructions or commands to transmit source element data from the source computing system(s) to multi-source anomaly detection computing platform 110. For instance, data may be transmitted in real-time as it is processed, in a batch process at a predetermined date or time, as a batch process after expiration of a time period (e.g., even 24 hours, every week, or the like), and the like. The generated instruction or command may be transmitted from the multi-source anomaly detection computing platform 110 to one or more source element systems, such as source computing system 120, source computing system 125, and the like.

Multi-source anomaly detection computing platform 110 may further have, store and/or include a source element processing module 112b. Source element processing module 112b may store instructions and/or data that may cause or enable the multi-source anomaly detection computing platform 110 to receive data from one or more sources, such as source computing system 120, source computing system 125, and the like. The source data may include source elements associated with different attributes, different users, and the like. For instance, the source data may include data associated with a compensation attributes and may include source elements such as annual compensation, rate of pay, expense reimbursement, bonus, and the like, for a plurality of employees at an enterprise. The plurality of employees may include employees in different business units, having a same or similar role, having different roles, having a same or similar level or band, having a different level or band, and the like. Data associated with each employee may be received by the multi-source anomaly detection computing platform 110 and processed using, for instance, machine learning.

For example, the multi-source anomaly detection computing platform 110 may have, store and/or include a machine learning engine 112c and machine learning datasets 112d. Machine learning engine 112c and machine learning datasets 112d may store instructions and/or data that may cause or enable multi-source anomaly detection computing platform 110 to receive attribute data, including a plurality of source elements, and analyze the data to identify any anomalies in the data. In some examples, the anomalies may include inadvertent errors made. Additionally or alternatively, the anomalies may include unauthorized activity.

Machine learning engine 112c may identify patterns in the attribute data to identify anomalies. The machine learning datasets 112d may be generated based on previously analyzed data (e.g., data from previously received data, historical data, and the like), raw data, and/or received from one or more outside sources.

The machine learning engine 112c may receive data related to attributes, source elements, and the like, and, using one or more machine learning algorithms, may generate and/or update or validate one or more machine learning datasets 112d. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112c may analyze data to identify patterns of activity, sequences of activity, and the like, to generate one or more machine learning datasets 112d.

Based on the generated machine learning datasets 112d, anomaly detection module 112e may identify one or more anomalies or variances in attribute data. For instance, in examples in which the attribute being analyzed is compensation, source elements related to salary, hourly wage, reimbursement, bonus, and the like, may be received and analyzed, by the anomaly detection module 112e, using machine learning. The outcome of the analysis may be input into other modules of the multi-source anomaly detection computing platform 110 for further processing or action.

For instance, multi-source anomaly detection computing platform 110 may further have, store and/or include a notification generation module 112f. Notification generation module 112f may store instructions and/or data that may cause or enable the multi-source anomaly detection computing platform 110 to generate one or more notifications, interactive user interfaces, or the like, based on the output of the anomaly detection module 112e. For instance, if an anomaly is detected, a notification or interactive user interface may be generated by the notification generation module 112f. The notification or interactive user interface may include information related to the anomaly or variance, such as type of anomaly (overpayment, underpayment, or the like), user associated with the anomaly, role of user associated with the anomaly, supervisor of user associated with an anomaly, and the like. In some examples, the data presented in the notification or interactive user interface might not include actual values associated with the attribute or source elements. For instance, actual compensation, bonus, or the like, associated with the user of the identified anomaly might not be displayed or provided, thereby maintaining privacy of the user. Further, omitting the actual values associated with the attributes and source elements may reduce processing required, computer storage required, and the like. In some examples, the notification or interactive user interface may include a selectable option to receive the raw data (e.g., compensation values) associated with the attribute and source elements for which the anomaly was detected. In some examples, requesting the raw data may require authorization from second user, supervisor, or the like, in order to maintain privacy.

The generated notification or interactive user interface may be transmitted to one or more user computing devices, such as local user computing device 150, local user computing device 155, remote user computing device 170, or remote user computing device 175. The notification or interactive user interface may be displayed on the device.

In some examples, data associated with the detection of an anomaly may be input into a rules execution module 112g. The rules execution module 112g may store instructions and/or data that may cause or enable the multi-source anomaly detection computing platform 110 to compare the output of the anomaly detection module 112e to pre-stored rules associated with mitigating actions to take with respect to various anomalies. Based on the comparing, one or more instructions or commands may be generated and transmitted to a source element device, such as source computing system 120, source computing system 125, or the like, for execution. For instance, if the anomaly detection module 112e identifies a particular group of users having an overpayment in a bonus and each user has a same supervisor, a pre-stored rule may be identified causing generation of an instruction or command to prevent the supervisor from assigning bonus values until an authorized user investigates the anomaly and clears it. The instruction or command may be transmitted to a computing system associated with bonuses (e.g., source computing system 120, source computing system 125, or the like) and may be executed to prevent the supervisor from distributing any additional bonus funds until the matter is investigated.

FIGS. 2A-2F depict one example illustrative event sequence for implementing and using multi-source anomaly detection in accordance with one or more aspects described herein. The events shown in the illustrative event sequence are merely one example sequence and additional events may be added, or events may be omitted, without departing from the invention.

Figure 2A:
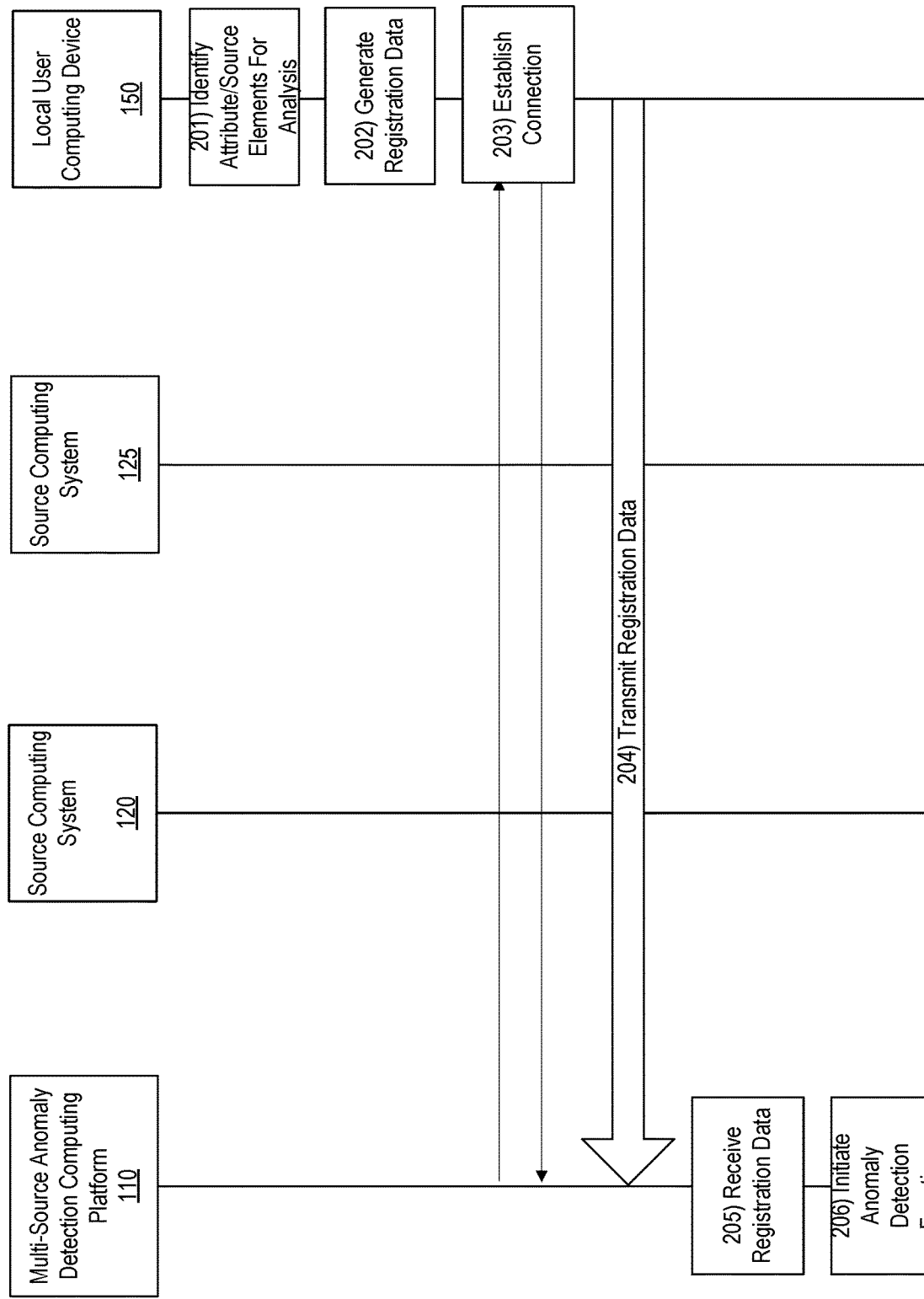

Referring to FIG. 2A, at step 201, one or more attributes for analysis and source elements associated with an attribute may be identified. For instance, compensation may be an attribute being evaluated and source elements, such as salary, bonus, deferred compensation, expense account reimbursement, and the like, associated with the compensation attribute may be identified. In another example, benefits costs may be the attribute being identified and source elements associated with benefit costs, such as healthcare, retirement plan, life insurance, disability insurance, and the like, may be identified. In some examples, each source element may be processed, stored, or the like, at a different source element computing system, such as source computing system 120, source computing system 125, or the like. Additionally or alternatively, two or more source elements may be processed, stored, or the like, by a same source element computing system, such as source computing system 120, source computing system 125, or the like.

After identifying the attribute being analyzed as well as associated source elements, the local user computing device 150 may generate registration data at step 202. Registration data may include identifiers associated with each source element system from which data will be received and analyzed (e.g., source computing system 120, source computing system 125, or the like), type of data to be transmitted from the source computing systems, amount of data to be transmitted, and the like.

At step 203, a connection may be established between the local user computing device 150 and the multi-source anomaly detection computing platform 110. For instance, a first wireless connection may be established between the multi-source anomaly detection computing platform 110 and local user computing device 150. Upon establishing the first wireless connection, a communication session may be initiated between multi-source anomaly detection computing platform 110 and local user computing device 150.

At step 204, the generated registration data may be transmitted from the local user computing device 150 to the multi-source anomaly detection computing platform 110. For instance, the generated registration data may be transmitted during the communication session initiated upon establishing the first wireless connection.

At step 205, the registration data may be received by the multi-source anomaly detection computing platform 110. Responsive to receiving the registration data, one or more anomaly detection functions may be initiated and/or activated at step 206. For instance, one or more processes or functions that was previously disabled or deactivated may be enabled or activated in response to receiving the registration data.

Figure 2B:
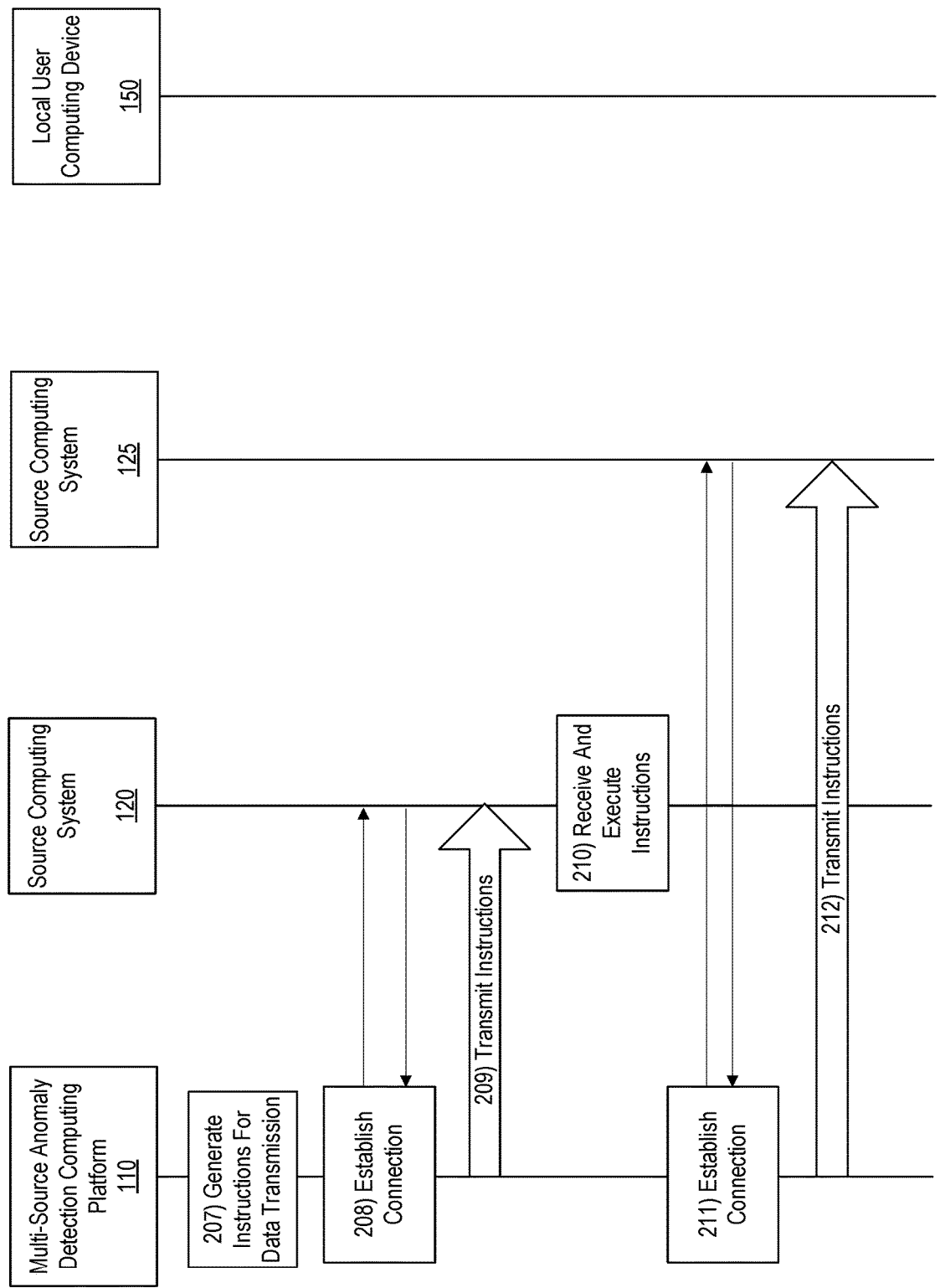

With reference to FIG. 2B, at step 207, instructions for data transmission may be generated. For instance, based on the registration data, instructions for type of data, frequency of transmission, and the like, may be generated for each source element data system, such as source computing system 120, source computing system 125, and the like. In some examples, data may be transmitted in real-time or near real-time as it is generated (e.g., as payroll is processed, data may be transmitted in real-time or near real-time to the multi-source anomaly detection computing platform 110). In another example, if bonuses are distributed on the second Wednesday of December, then that data may be transmitted in a batch process on that date. Various other frequencies for transmission of data may be used without departing from the invention.

After generating the instruction(s) for data transmission, the instructions may be transmitted to each source element data system, such as a source computing system 120, source computing system 125, and the like. Accordingly, at step 208, a connection may be established between multi-source anomaly detection computing platform 110 and source computing system 120. For instance, a second wireless connection may be established between the multi-source anomaly detection computing platform 110 and source computing system 120. Upon establishing the second wireless connection, a communication session may be initiated between multi-source anomaly detection computing platform 110 and source computing system 120.

At step 209, the instruction generated for transmission of source element data from source computing system 120 may be transmitted from the multi-source anomaly detection computing platform 110 to the source computing system 120. For instance, the instruction may be transmitted during the communication session initiated upon establishing the second wireless connection.

At step 210, the instruction may be received by the source computing system 120 and executed by the system to retrieve and transmit identified data at the identified frequency.

At step 211, a connection may be established between multi-source anomaly detection computing platform 110 and source computing system 125. For instance, a third wireless connection may be established between the multi-source anomaly detection computing platform 110 and source computing system 125. Upon establishing the third wireless connection, a communication session may be initiated between multi-source anomaly detection computing platform 110 and source computing system 125.

At step 212, the instruction generated for transmission of source element data from source computing system 125 may be transmitted from the multi-source anomaly detection computing platform 110 to the source computing system 125. For instance, the instruction may be transmitted during the communication session initiated upon establishing the third wireless connection.

With reference to FIG. 2C, at step 213, the instruction may be received by the source computing system 125 and executed by the system to retrieve and transmit identified data at the identified frequency.

At step 214, source element response data may be retrieved for transmission to the multi-source anomaly detection computing platform 110. For instance, at the frequency, date and time, or the like, identified in the instruction from the multi-source anomaly detection computing platform 110 the identified data may be retrieved, response data may be generated and, at step 215, the source element response data may be transmitted from the source computing system 120 to multi-source anomaly detection computing platform 110.

At step 216, the source element response data may be received by the multi-source anomaly detection computing platform 110.

At step 217, source element response data may be retrieved for transmission to the multi-source anomaly detection computing platform 110. For instance, at the frequency, date and time, or the like, identified in the instruction from the multi-source anomaly detection computing platform 110 the identified source element data may be retrieved, source element response data may be generated and, at step 218, source element response data may be transmitted from the source computing system 125 to multi-source anomaly detection computing platform 110.

With reference to FIG. 2D, at step 219, the source element response data may be received by the multi-source anomaly detection computing platform 110.

In some examples, the source element data received from source computing system 120 may be different (e.g., different type of data, different source element, different attribute, or the like) from the source element data received from source computing system 125.

In some examples, the source element response data may be mapped as it is received by the multi-source anomaly detection computing platform 110. For instance, source element data received may be mapped to a single table with each person having entries for salary, bonus, expense reimbursement, and the like, as well as employment details such as team, group or business unit, salary band or level, role within the organization, and the like.

At step 220, the received source element response data may be analyzing using, for instance, machine learning. For example, the source element response data from one or more or all source element computer systems, such as source computing system 120, source computing system 125, and the like, may be analyzed to identify patterns, sequences, and the like, as well as any outliers from the identified patterns, sequences, and the like.

Based on the analysis, at step 221, an anomaly or variance in the source element data may be detected. As discussed herein, the anomaly may include an inadvertent error and/or an unauthorized action.

At step 222, data associated with the detected anomaly or variance may be extracted. For instance, a user associated with the anomaly, role of the user associated with the anomaly, supervisor of the user associated with the anomaly, amount of the anomaly, frequency of the anomaly (e.g., if the anomaly occurred more than once), and the like, may be extracted from the data. In some examples, actual values associated with the source element data may be omitted or obscured to maintain privacy of the user. For instance, if compensation is the attribute being evaluated and an anomaly is detected for a user, the actual values of the user's compensation may be removed from the data, obscured or otherwise omitted in order to prevent distribution of the compensation values. If the compensation values are going to be used in further investigation, an investigating user may request the values or raw data for further analysis.

At step 223, a notification or interactive user interface may be generated. For instance, based on the extracted data, a notification or interactive user interface may be generated include a type of anomaly, frequency of anomaly, user(s) involved, and the like.

Figure 2E:
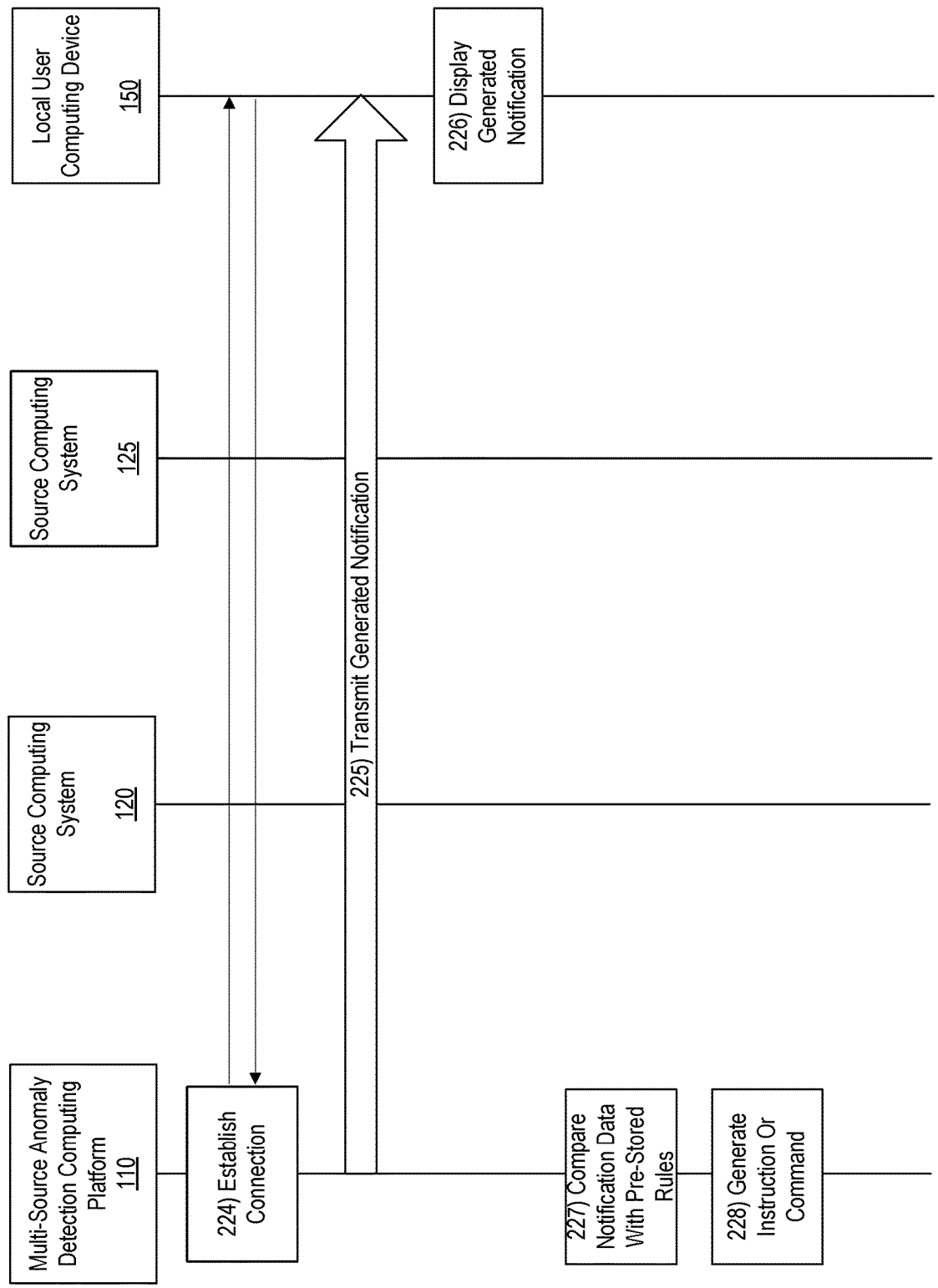

With reference to FIG. 2E, at step 224, a connection may be established between multi-source anomaly detection computing platform 110 and local user computing device 150. For instance, a fourth wireless connection may be established between the multi-source anomaly detection computing platform 110 and local user computing device 150. Upon establishing the fourth wireless connection, a communication session may be initiated between multi-source anomaly detection computing platform 110 and local user computing device 150.

At step 225, the generated notification may be transmitted from the multi-source anomaly detection computing platform 110 to the local user computing device 150. For instance, the generated notification may be transmitted during the communication session initiated upon establishing the fourth wireless connection.

At step 226, the notification may be received by the local user computing device 150 and displayed by a display of the local user computing device 150. In some examples, the notification may include an interactive user interface with options to request additional information, raw data, and the like.

At step 227, the notification data (e.g., type of anomaly, user data, and the like) may be compared to pre-stored rules. For instance, a type of anomaly may be compared to pre-stored rules related to actions (e.g., mitigating actions) to be implemented (in some examples, automatically) in response to a particular type of anomaly, particular amount associated with an anomaly, nature of an anomaly, or the like.

Based on the comparison to the pre-stored rules, if a rule applies to the data associated with this particular anomaly (e.g., from the notification), one or more instructions or commands may be generated at step 228. The instruction or command may be executed to mitigate an impact of the detected anomaly. The instruction or command may be transmitted to one or more source element systems, such as source computing system 120, source computing system 125, or the like, for execution.

With reference to FIG. 2F, at step 229, a connection may be established between multi-source anomaly detection computing platform 110 and source computing system 120. For instance, a fifth wireless connection may be established between the multi-source anomaly detection computing platform 110 and source computing system 120. Upon establishing the fifth wireless connection, a communication session may be initiated between the multi-source anomaly detection computing platform 110 and the source computing system 120.

At step 230, the generated instruction or command may be transmitted from the multi-source anomaly detection computing platform 110 to the source computing system 120. At step 231, the instruction or command may be received by source computing system 120 and executed by source computing system 120.

At step 232, a connection may be established between multi-source anomaly detection computing platform 110 and source computing system 125. For instance, a sixth wireless connection may be established between the multi-source anomaly detection computing platform 110 and source computing system 125. Upon establishing the sixth wireless connection, a communication session may be initiated between the multi-source anomaly detection computing platform 110 and the source computing system 125.

At step 233, the generated instruction or command may be transmitted from the multi-source anomaly detection computing platform 110 to the source computing system 125. At step 234, the instruction or command may be received by source computing system 125 and executed by source computing system 125.

The executed instruction or command may cause the source computing system to execute processes, functions or actions to mitigate impact of an anomaly. For instance, the executed instruction or command may prevent access to one or more systems by one or more users, may institute a requirement for additional authentication or a second user authentication to access one or more systems or applications, may prevent a user from dispensing funds for a particular purpose or using a particular system, or the like.

Figure 3:
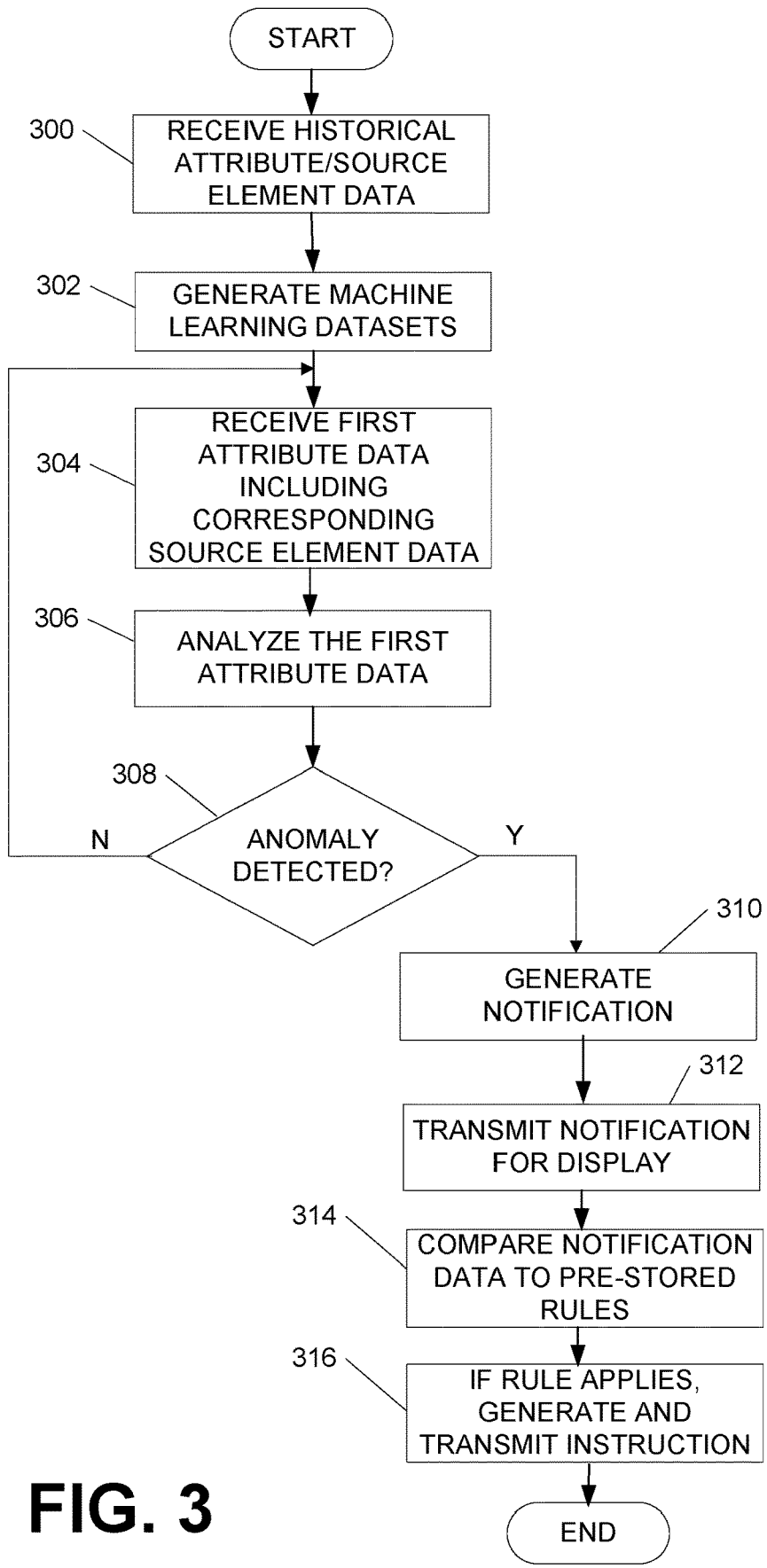
FIG. 3 depicts an illustrative method for implementing and using multi-source anomaly detection according to one or more aspects described herein.

FIG. 3 is a flow chart illustrating one example method of implementing multi-source anomaly detection according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, historical or machine learning training data may be received from one or more sources. The data may include data associated with various attributes, as well as a plurality of source elements associated with each attribute. Based on the received data, one or more machine learning datasets may be generated at step 302.

At step 304, first attribute data including corresponding source element data may be received. In some examples, the first attribute data may be related to an attribute such as compensation, benefits, or the like, for a plurality of employees within an enterprise, and the source element data may include source elements associated with each attribute, as discussed herein.

At step 306, the received first attribute data may be analyzed using, for example, machine learning. For instance, the generated machine learning datasets may be used to analyze the received first attribute data and associated source element data to determine whether any anomalies in the data exist. Anomalies may be detected based on comparison of source elements between users within a group such as a business unit, between users having a same role within the enterprise, between users having similar job duties within the enterprise, between users having similar patterns of compensation, or the like. Anomalies may be detected based on various other aspects without departing from the invention.

At step 308, a determination may be made as to whether an anomaly or variance has been detected. If not, the process may return to step 304 and additional attribute data (e.g., second attribute data) and associated source element data may be received and analyzed.

If, at step 308, an anomaly or variance is detected, a notification may be generated at step 310. In some examples, the notification may include data associated with the anomaly (e.g., type of anomaly, amount of anomaly, or the like), one or more users associated with the anomaly (e.g., employee and supervisor, or the like), source element associated with the anomaly, and the like. In some arrangements, the notification might not include raw data or actual values associated with the analyzed source element data. This information may be requested in order to conduct an investigation but not presented in an initial notification in order to maintain privacy of a user, reduce computing and storage resources, and the like.

At step 312, the notification may be transmitted to a computing device for display. For instance, the notification may be transmitted to an administrator or other supervisory user for evaluation, next steps, further processing, or the like.

At step 314, the notification data (e.g., data presented in notification) may be compared to pre-stored rules. The pre-stored rules may be associated with actions to be implemented in response to particular types of anomalies, amounts of anomalies, or the like.

At step 316, based on the comparison, if a pre-stored rule applies to the notification data, an instruction or command may be generated and transmitted to one or more source element systems from which attribute data including one or more source elements is received. For instance, an instruction or command to limit accessibility to one or more systems, prevent actions taken within a system or application, or the like, may be generated and transmitted to one or more source systems, such as source computing system 120, source computing system 125, or the like, for execution.

Figure 4:
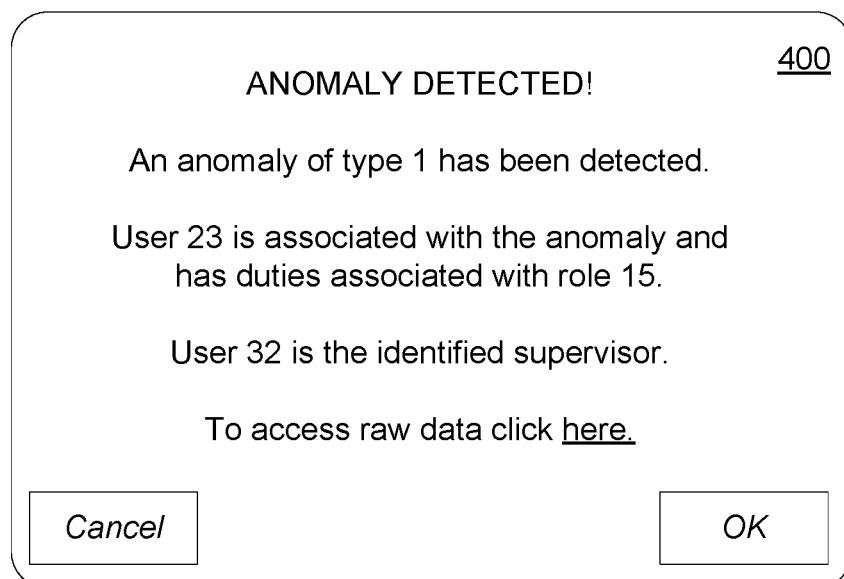
FIG. 4 illustrates one example operating user interface that may be generated in accordance with one or more aspects described herein.

FIG. 4 illustrates one example interactive user interface displaying notification data in accordance with one or more aspects described herein. The interface 400 includes identification of a type of anomaly, user associated with the anomaly and role of the user, as well as a supervisor of the user associated with the anomaly. The data provided is merely one example of data that may be displayed and more or fewer items may be displayed without departing from the invention.

The user interface 400 further includes a selectable option to review raw data associated with the anomaly. As discussed herein, actual values associated with the anomaly might not be displayed with the notification to reduce computing resources and storage, maintain privacy, and the like. Accordingly, selection of the option to receive the raw data may prompt the system to collect the raw data and transmit it in a predetermined format to the user device. In some examples, selection of the option to request raw data may cause display of a second user interface requiring approval from a supervisor or second user to retrieve the raw data.

As discussed herein, aspects described herein are directed to evaluating attribute data associated with a plurality of users, such as employees or an organization, large enterprise organization, or the like. The attribute data may be analyzed using machine learning to identify anomalies or variances in the data and generate dynamic resolution instructions that may be executed, in some examples, automatically, to mitigate impact of an anomaly or variance.

As discussed herein, attribute data may be received from a plurality of sources. For instance, source element data associated with each attribute may be received from one or more source element computing devices or systems. Accordingly, data from multiple sources may be analyzed in the same process or simultaneously to capture a whole picture of the attribute in order to detect anomalies.

For instance, in analyzing an attribute such as compensation, compensation values (e.g., source element data) from various sources may be received and analyzed together. For example, salary, bonus, hourly rate, expense account reimbursement and associated details, parking, travel, phone costs, and the like, may be evaluated in a process to detect potential anomalies between users, between business units, across the organization, or the like. In some examples, employment information of the users may be considered in the evaluation to identify anomalies across users having different or the same title, job duties, or the like.

For example, user A in group A may have a similar job to user B in group B. User A and User B may have similar tenure with the organization. Accordingly, it would be expected that user A and user B would have similar compensation levels. However, based on the analysis described herein, an anomaly may identify that user B is paid considerably more than user A. This may prompt generation of a notification and investigation into why user B is paid so much more. Granular analysis across all employees within an organization is not possible or efficient using conventional systems. Accordingly, anomalies might not be detected if conventional systems are relied upon. The arrangements described herein may aid in reducing or eliminating human resources risk across teams, within teams, and the like, to compensation is as expected for various employees.

In another example, unauthorized activity by users may be detected using the arrangements discussed herein. For instance, arrangements discussed herein may be used to identify overpayment of reimbursement expenses by a particular supervisor for one or more users, reimbursement of certain expenses for some users and not others by one or more supervisors or business units or teams (e.g., consistency of what is being reimbursed within or between teams), distribution of most promising leads in commission based positions to particular users by a supervisor, and the like. These and various other unauthorized activities may be detected by analyzing the attribute data for users across the organization using the arrangements described herein.

As discussed herein, machine learning datasets may be generated using training data or other historical data. This data may be used to generate baseline values and the datasets may be validated and/or updated based on subsequent data. The historical data used to train the machine learning techniques or establish the baseline data may include user-based data, role-based data, salary band or level-based data, and the like, across the organization. This data establishes baseline levels and should not have great variance. For instance, in the example of expense reimbursements, there should be relatively little variance between users of similar roles, or the like, because everyone should be expensing similar items, receiving similar reimbursement, and the like.

Accordingly, because machine learning can be used to quickly and efficiently evaluate data across the entire organization, the analysis may trigger notifications based on various anomalies that would likely be missed in conventional systems.

As also discussed herein, anomalies may be flagged and notifications may be generated and provided based on the detected anomaly without providing the actual compensation values for a user. For instance, evaluation of data points may be performed with a binary (0, 1) output. If not issue or anomaly is detected, a 0 value may be output. A detected anomaly may cause output of a 1 which may then trigger alerts, notifications, and the like. This may reduce processing power required, storage required for the outputs, and the like. The notification, as discussed herein, may then provide an option to receive the raw data.

In some examples, if an anomaly meets a predetermined threshold, the raw data (e.g., compensation values for one or more users, or the like) may be automatically provided in a notification. For instance, if an anomaly indicates at least a threshold variance from a normal or expected value, the raw data, including, for instance, compensation values, may be automatically provided to the administrative user reviewing the anomalies in order to quickly and efficiently evaluate the anomaly. In some examples, the threshold and associated parameters may be stored as a pre-stored rule that may be triggered based on data associated with the anomaly.

In some examples, the raw data provided may include data for the user having the anomaly, as well as data for associated users. For instance, if a user within a business unit has substantially higher compensation than others with similar roles within the business unit, raw data for only that business unit may be retrieved initially to permit evaluation of the user associated with the anomaly.

In some examples, open source data, such as locality data, and the like, may be considered during evaluation of the attribute data. Accordingly, the system may detect an anomaly in compensation but may then recognize that the user is located in a high cost of living area and may recognize that the discrepancy is due to the difference in locality and, thus, is not an anomaly.

Figure 5:
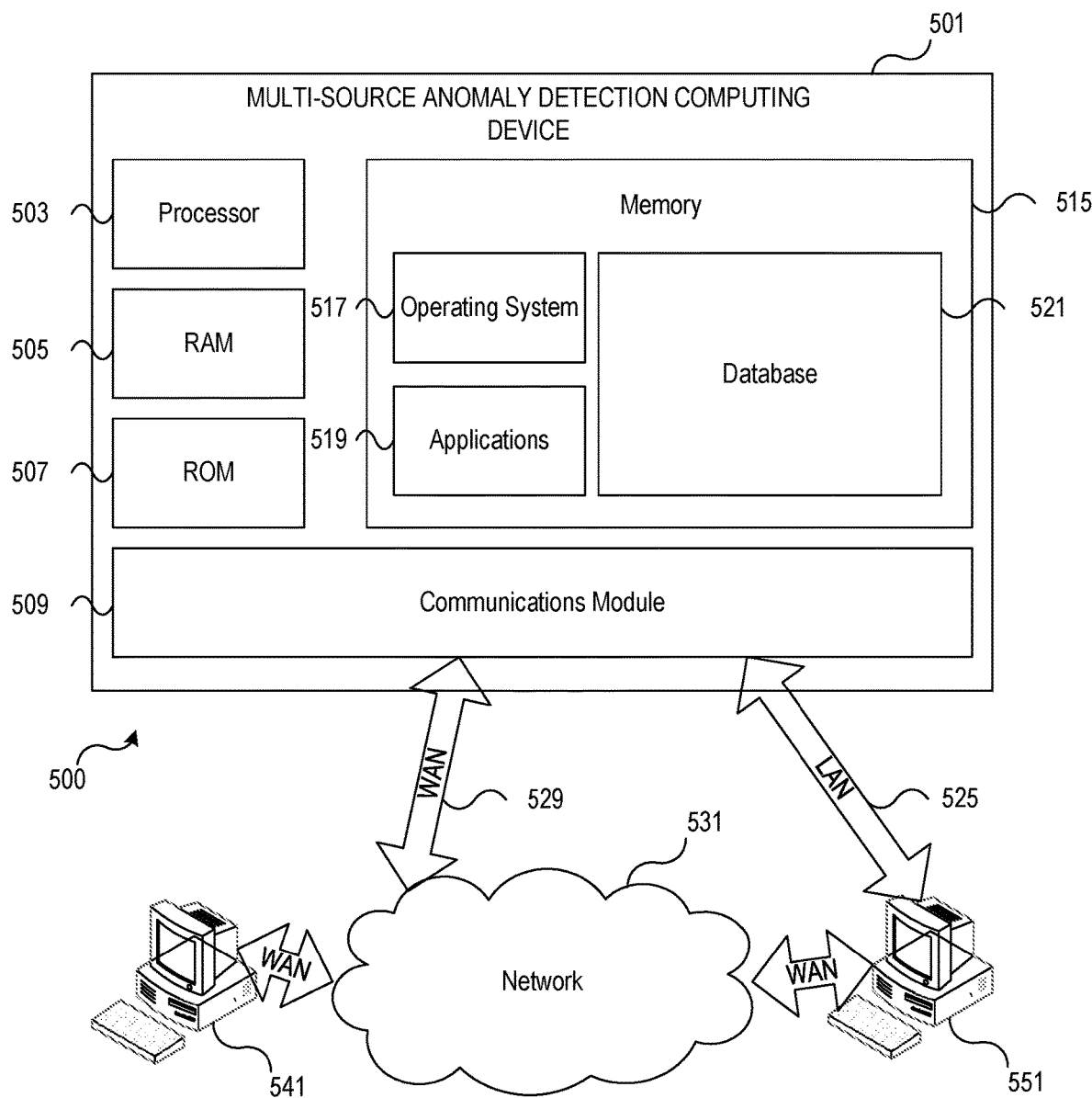
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include multi-source anomaly detection computing device 501 having processor 503 for controlling overall operation of multi-source anomaly detection computing device 501 and its associated components, including Random Access Memory (RAM) 505, Read-Only Memory (ROM) 507, communications module 509, and memory 515. Multi-source anomaly detection computing device 501 may include a variety of computer readable media. Computer readable media may be any available media that may be accessed by multi-source anomaly detection computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by multi-source anomaly detection computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on multi-source anomaly detection computing device 501. Such a processor may execute computer-executable instructions stored on a computer-readable medium.

Software may be stored within memory 515 and/or storage to provide instructions to processor 503 for enabling multi-source anomaly detection computing device 501 to perform various functions as discussed herein. For example, memory 515 may store software used by multi-source anomaly detection computing device 501, such as operating system 517, application programs 519, and associated database 521. Also, some or all of the computer executable instructions for multi-source anomaly detection computing device 501 may be embodied in hardware or firmware. Although not shown, RAM 505 may include one or more applications representing the application data stored in RAM 505 while multi-source anomaly detection computing device 501 is on and corresponding software applications (e.g., software tasks) are running on multi-source anomaly detection computing device 501.

Communications module 509 may include a microphone, keypad, touch screen, and/or stylus through which a user of multi-source anomaly detection computing device 501 may provide input, and may also include one or more of a speaker for providing audio output and a video display device for providing textual, audiovisual and/or graphical output. Computing system environment 500 may also include optical scanners (not shown).

Multi-source anomaly detection computing device 501 may operate in a networked environment supporting connections to one or more remote computing devices, such as computing devices 541 and 551. Computing devices 541 and 551 may be personal computing devices or servers that include any or all of the elements described above relative to multi-source anomaly detection computing device 501.

The network connections depicted in FIG. 5 may include Local Area Network (LAN) 525 and Wide Area Network (WAN) 529, as well as other networks. When used in a LAN networking environment, multi-source anomaly detection computing device 501 may be connected to LAN 525 through a network interface or adapter in communications module 509. When used in a WAN networking environment, multi-source anomaly detection computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
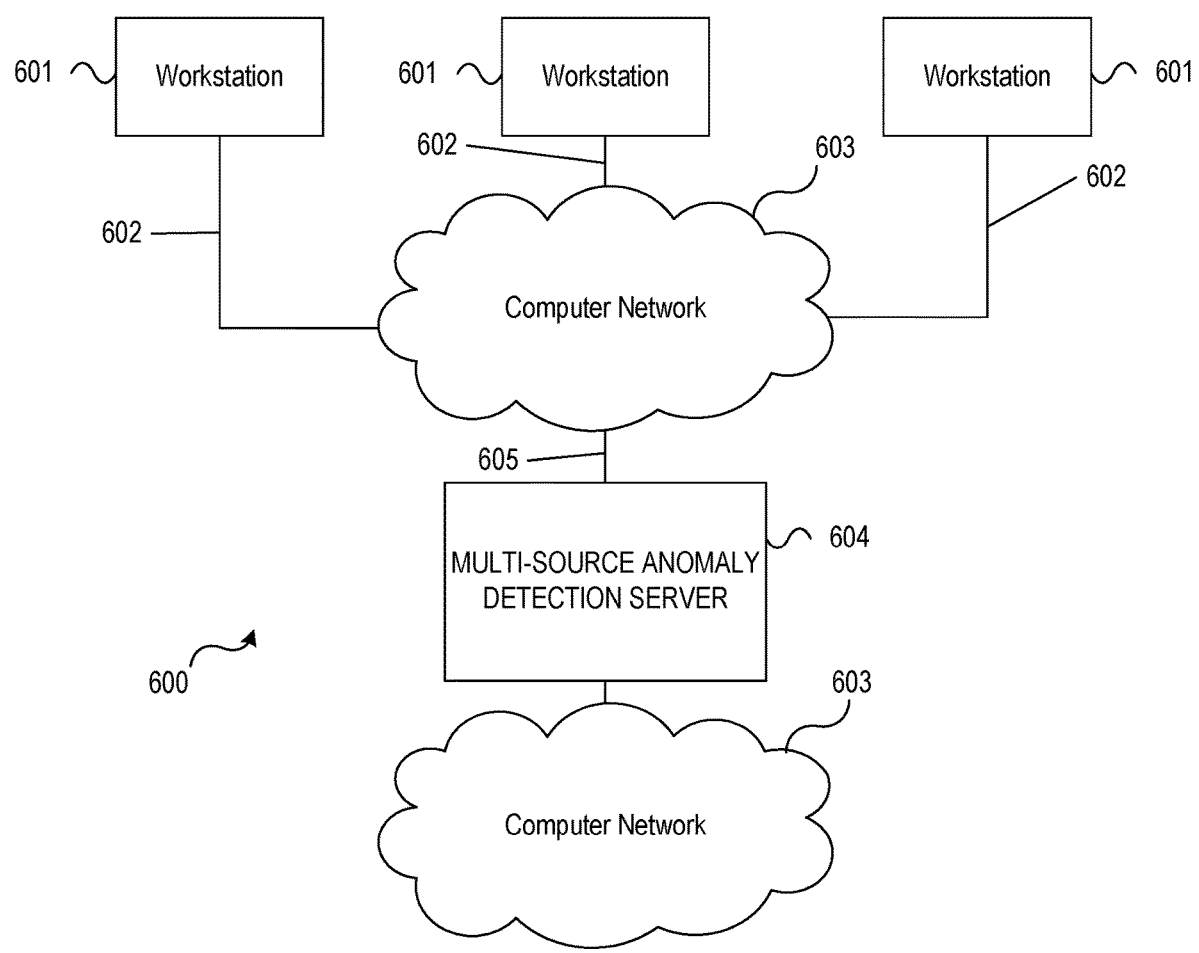
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to multi-source anomaly detection server 604. In system 600, multi-source anomaly detection server 604 may be a server, processor, computer, or data processing device, or combination of the same, configured to perform the functions and/or processes described herein. Server 604 may be used to receive historical data, generate machine learning datasets, receive attribute data including source element data, analyze source element data to detect anomalies, generate notifications, generate instructions for mitigating actions, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and multi-source anomaly detection server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive first attribute data and a plurality of associated source elements for a plurality of users;

analyze the first attribute data using machine learning datasets;

based on the analysis of the first attribute data, determine whether an anomaly is present in the first attribute data, wherein determining whether an anomaly is present in the first attribute data further includes determining whether one of: an overpayment and an underpayment have been made to the first user;

responsive determining that an anomaly is present in the first attribute data:

generate a notification including data associated with the anomaly and data associated with a first user associated with the anomaly;

transmit the notification to a computing device of a second user different from the first user;

compare the data associated with the anomaly and the data associated with the first user to pre-stored rules;

generate, based on the comparing, an instruction modifying access to one or more systems from which the plurality of associated source elements is received;

transmit the generated instruction modifying access to the one or more systems from which the plurality of associated source elements is received to the one or more systems from which the plurality of source elements is received for execution; and responsive to determining that an anomaly is not present in the first attribute data, receive and analyze additional attribute data.

2. The computing platform of claim 1, further including instructions that, when executed, cause the computing platform to:

receive historical data related to a plurality of attributes, each attribute associated with a user and each attribute including a plurality of source elements; and generate, based on the received historical data, a plurality of machine learning datasets for analyzing attribute data.

3. The computing platform of claim 1, wherein the second user is a supervisor of the first user.

4. The computing platform of claim 1, wherein the generated notification does not include raw data including values associated with the plurality of associated source elements associated with the first attribute.

5. The computing platform of claim 1, wherein the first attribute is a compensation attribute and the plurality of associated source elements includes at least two of: salary and bonus for each user of the plurality of users.

6. The computing platform of claim 1, wherein the generated instruction modifying access to the one or more systems from which the plurality of associated source elements is received includes an instruction preventing disbursement of funds to the first user.

7. A method, comprising:

receiving, by a computing platform having at least a first processor and memory, first attribute data and a plurality of associated source elements for a plurality of users;

analyzing, by the at least a first processor, the first attribute data using machine learning datasets;

based on the analysis of the first attribute data, determining, by the at least a first processor, whether an anomaly is present in the first attribute data, wherein determining whether an anomaly is present in the first attribute data further includes determining whether one of: an overpayment and an underpayment have been made to the first user;

if it is determined that an anomaly is present in the first attribute data:

generating, by the at least a first processor, a notification including data associated with the anomaly and data associated with a first user associated with the anomaly;

transmitting, by the at least a first processor, the notification to a computing device of a second user different from the first user;

comparing, by the at least a first processor, the data associated with the anomaly and the data associated with the first user to pre-stored rules;

generating, by the at least a first processor and based on the comparing, an instruction modifying access to one or more systems from which the plurality of associated source elements is received;

transmitting, by the at least a first processor, the generated instruction modifying access to the one or more systems from which the plurality of associated source elements is received to the one or more systems from which the plurality of source elements is received for execution; and if it is determined that an anomaly is not present in the first attribute data, receiving and analyzing, by the first processor, additional attribute data.

8. The method of claim 7, further including:

receiving, by the at least a first processor, historical data related to a plurality of attributes, each attribute associated with a user and each attribute including a plurality of source elements; and generating, by the at least a first processor and based on the received historical data, a plurality of machine learning datasets for analyzing attribute data.

9. The method of claim 7, wherein the second user is a supervisor of the first user.

10. The method of claim 7, wherein the generated notification does not include raw data including values associated with the plurality of associated source elements associated with the first attribute.

11. The method of claim 7, wherein the first attribute is a compensation attribute and the plurality of associated source elements includes at least two of: salary and bonus for each user of the plurality of users.

12. The method of claim 7, wherein the generated instruction modifying access to the one or more systems from which the plurality of associated source elements is received includes an instruction preventing disbursement of funds to the first user.

13. One or more non-transitory computer-readable media storing instructions that, when executed by a computing device comprising at least one processor, memory, and a communication interface, cause the computing device to:

receive first attribute data and a plurality of associated source elements for a plurality of users;

analyze the first attribute data using machine learning datasets;

based on the analysis of the first attribute data, determine whether an anomaly is present in the first attribute data, wherein determining whether an anomaly is present in the first attribute data further includes determining whether one of: an overpayment and an underpayment have been made to the first user;

responsive determining that an anomaly is present in the first attribute data:

generate a notification including data associated with the anomaly and data associated with a first user associated with the anomaly;

transmit the notification to a computing device of a second user different from the first user;

compare the data associated with the anomaly and the data associated with the first user to pre-stored rules;

generate, based on the comparing, an instruction modifying access to one or more systems from which the plurality of associated source elements is received;

transmit the generated instruction modifying access to the one or more systems from which the plurality of associated source elements is received to the one or more systems from which the plurality of source elements is received for execution; and responsive to determining that an anomaly is not present in the first attribute data, receive and analyze additional attribute data.

14. The one or more non-transitory computer-readable media of claim 13, further including instructions that, when executed, cause the computing device to:

receive historical data related to a plurality of attributes, each attribute associated with a user and each attribute including a plurality of source elements; and generate, based on the received historical data, a plurality of machine learning datasets for analyzing attribute data.

15. The one or more non-transitory computer-readable media of claim 13, wherein the second user is a supervisor of the first user.

16. The one or more non-transitory computer-readable media of claim 13, wherein the generated notification does not include raw data including values associated with the plurality of associated source elements associated with the first attribute.

17. The one or more non-transitory computer-readable media of claim 13, wherein the first attribute is a compensation attribute and the plurality of associated source elements includes at least two of: salary and bonus for each user of the plurality of users.

18. The one or more non-transitory computer-readable media of claim 13, wherein the generated instruction modifying access to the one or more systems from which the plurality of associated source elements is received includes an instruction preventing disbursement of funds to the first user.

* * * * *